United States Patent [19]

Maslow

[11] Patent Number: 5,580,146
[45] Date of Patent: Dec. 3, 1996

[54] REAR SCREEN VIDEO DISPLAY SYSTEM

[75] Inventor: Marvin Maslow, New York, N.Y.

[73] Assignee: Projectavision, Inc., New York, N.Y.

[21] Appl. No.: 514,036

[22] Filed: Aug. 11, 1995

Related U.S. Application Data

[63] Continuation-in-part of Ser. No. 243,885, May 17, 1994, abandoned, which is a continuation-in-part of Ser. No. 224,053, Apr. 7, 1994, Pat. No. 5,491,585, which is a continuation of Ser. No. 979,135, Nov. 20, 1992, abandoned.

[51] Int. Cl.⁶ .................................................. G03B 21/28
[52] U.S. Cl. .............................. 353/74; 353/77; 353/72
[58] Field of Search ................................. 353/74, 77, 78, 353/79, 71, 72, 73, 119

[56] References Cited

U.S. PATENT DOCUMENTS

| | | | |
|---|---|---|---|
| 1,283,590 | 11/1918 | Stavenhager | 353/73 |
| 3,447,783 | 11/1969 | McCasland | 353/78 |
| 3,749,472 | 7/1973 | Young | 353/73 |
| 3,870,411 | 3/1975 | Schwartz et al. | 353/73 |
| 5,491,585 | 2/1996 | Dolgoff | 353/78 |

*Primary Examiner*—William Dowling
*Attorney, Agent, or Firm*—Anderson Kill & Olick P.C.

[57] ABSTRACT

A rear screen video display system includes a panel assembly having a front panel for supporting a screen, a base panel attachable to the front panel, and two side panels pivotally attached to the front panel, the system further includes a housing structure supported on the base panel for housing a projector, the base panel having elements cooperating with respective elements of housing structure for releasably retaining the structure, the housing structure receiving a stand for supporting the projector in the housing.

9 Claims, 16 Drawing Sheets

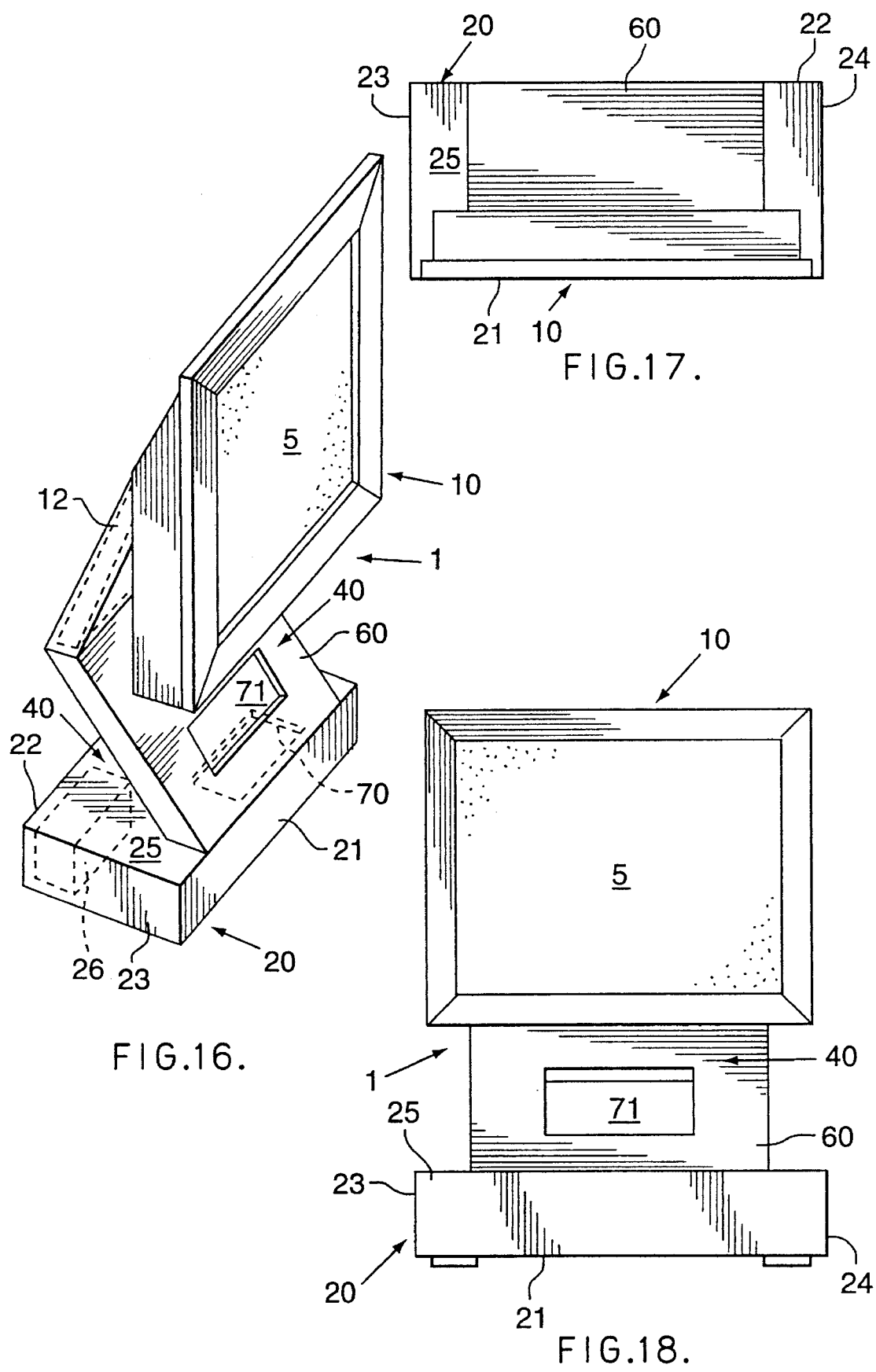

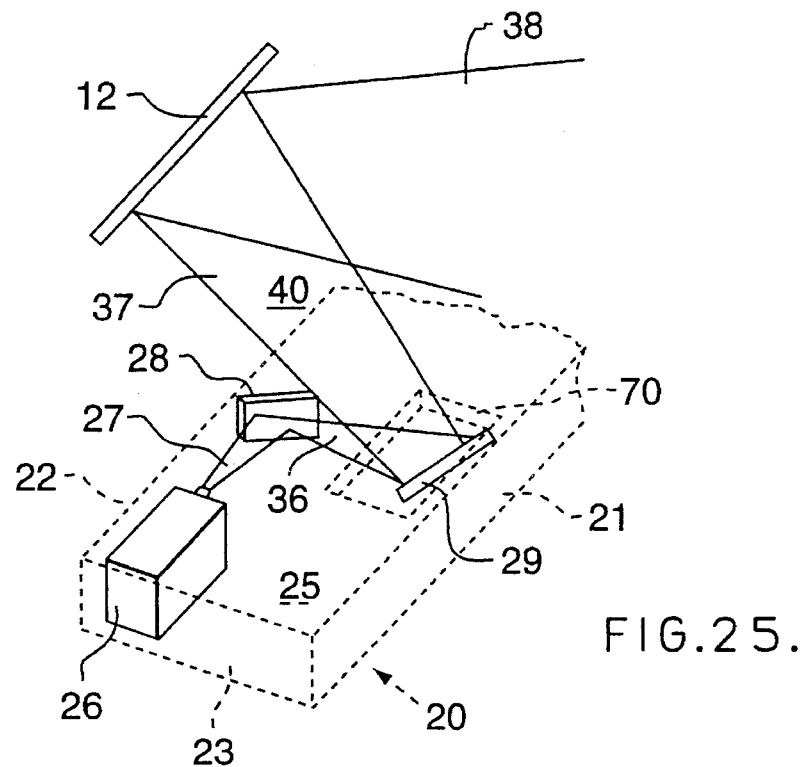
FIG.25.
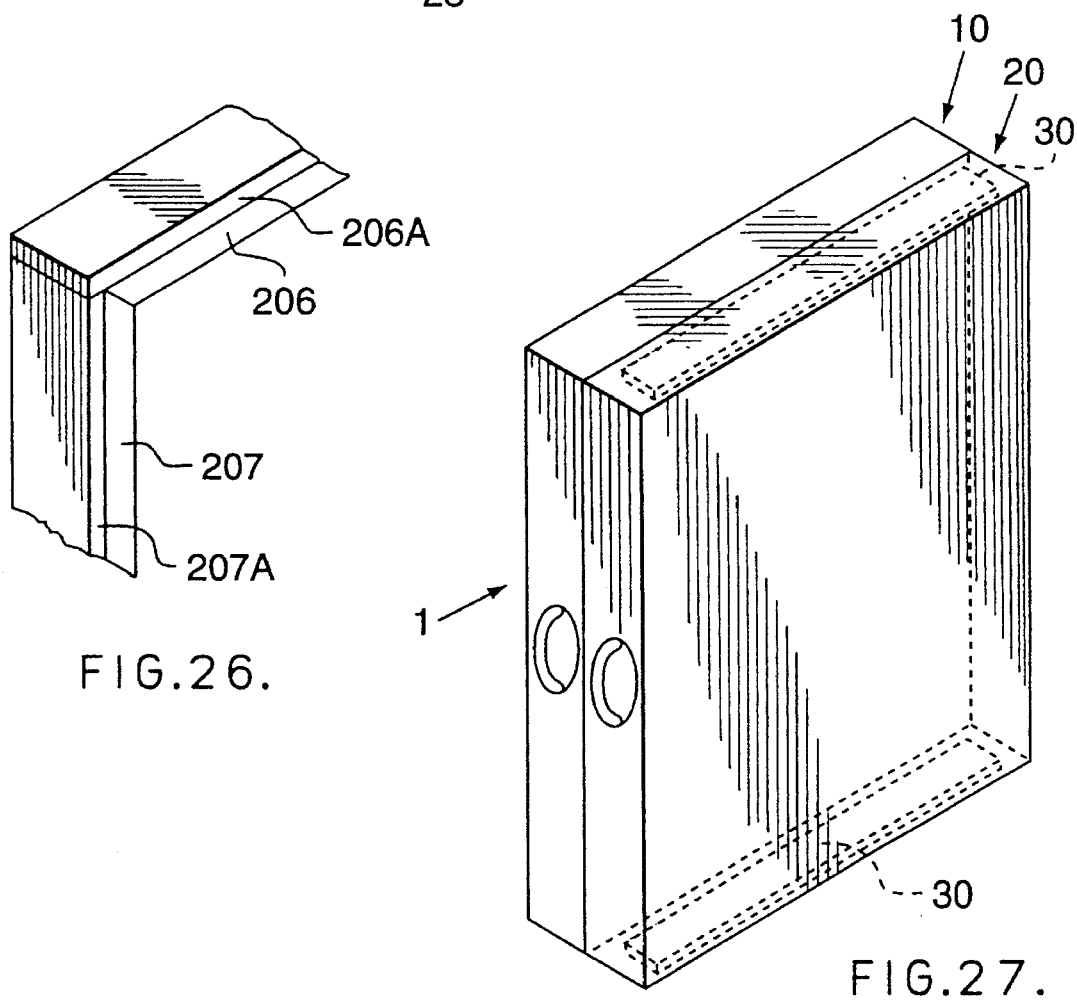
FIG.26.
FIG.27.

REAR SCREEN VIDEO DISPLAY SYSTEM

RELATED APPLICATIONS

This is a continuation-in-part of U.S. application Ser. No. 08/243,885, filed May 17, 1994, now abandoned which is as a continuation-in-part of U.S. application Ser. No., 08/224,053, filed Apr. 7, 1994, now U.S. Pat. No. 5,491,585, which is a continuation of U.S. application Ser. No. 07/979,135, filed Nov. 20, 1992, now abandoned directed to a PORTABLE REAR SCREEN TELEVISION CABINET.

FIELD OF THE INVENTION

The present invention is directed to video display systems and more particularly to rear screen video display systems with panels that are removable or collapsible for transport or for providing portability for the overall system.

BACKGROUND OF THE INVENTION

Rear-screen video display systems today typically include a giant cabinet, containing mirrors and a video projector within the cabinet. Such cabinets are very cumbersome, heavy, have large depth, and the optics therein must be carefully aligned, particularly if there are three images emanating from three CRTs in the cabinet. Further, if the projector and mirrors inside the cabinet are moved in relation to the screen, the image becomes poor because proper convergence is destroyed and this results in color fringing.

Additionally, such rear screen video display systems are typically neither portable nor "modular" in construction, and the various components of the system are therefore not separable or foldable for portability, ease of component replacement and/or packaging convenience.

Projection televisions which do not require a screen and which project an image directly onto a wall are a recent phenomenon and are described in Projectavision's U.S. Pat. Nos. 5,012,274 and 5,300,942. However where there is, for instance, inadequate wall space or if the wall is painted in a dark color, or the wall has irregular surfaces, or is in a very brightly lit room, images from such projection televisions are not easily and clearly viewable. Additionally, there is often no place to position the projector conveniently, or people could inadvertently walk in the beam path.

CRT rear screen projection televisions are available but are very heavy and bulky and consume much space in a typical room. Furthermore, movers are required for installation of such units and subsequently moving such units is extremely difficult.

Accordingly, an object of the present invention is to provide a rear screen video display system which would permit viewing of an image from a projector, where there is inadequate wall space.

Another object of the invention is to provide a rear screen video display system which would permit viewing of an image from a projector in a brightly lit room or where the wall conditions are less than optimal for viewing a projected image.

Yet another object of the invention is to provide a rear screen video display system which is foldable and easily portable.

A further object of the invention is to provide a rear screen video display system, in which components of the overall system are "modular" in construction for portability, easy replacement of major components, and for packaging convenience.

A still further object of the invention is to provide a rear screen video display system having surface trimmings which are changeable.

A further object of the invention is to provide a rear screen video display system wherein the projector is easily and rapidly removable and may also be used for "front" rather than rear projection, if desired.

SUMMARY OF THE INVENTION

These and other objects of the invention, which shall become apparent hereafter, are achieved by providing a rear screen video display system including a base unit with a built in projector or a projector which may simply be "plugged in" to the unit, a screen unit, one or more mirrors and connecting means, such as legs or a "pillar," extending between the base and screen units.

In a "modular" embodiment, the screen unit is removable from the connecting means which, in turn, is removable from the base unit. The screen unit and the base unit may, in one embodiment, unfold from a very thin profile into their operational configuration and may be detachable from the connecting means holding the base unit and the screen unit at a distance.

The display may also have surface trimmings which are changeable if a part of the cabinet exterior becomes worn, damaged or if the owner desires simply a different external appearance of the device.

In another embodiment, the rear screen video display system includes a panel assembly formed of a front panel for supporting a screen, a base panel pivotally attachable to the front panel, and two side panels pivotally attachable to the front panel, a housing table on the base panel for housing a projector. The base panel cooperates with a box-like structure for releasably retaining a projector. A projector support stand may be used for supporting the projector in the housing.

BRIEF DESCRIPTION OF THE DRAWINGS

The invention will be better understood from the following Detailed Description of the Preferred Embodiments, when read with reference to the accompanying drawings, in which:

FIG. 16 is a front perspective view of a fourth embodiment of a rear screen video display system according to the present invention;

FIG. 17 is a top view of the rear screen video display system of FIG. 16;

FIG. 18 is a front view of the rear screen video display system of FIG. 16;

FIG. 25 is a perspective view of a three-mirror system of the rear screen video display system according to the present invention;

FIG. 26 is a perspective view of a panel surface replacement feature of the present invention;

FIG. 27 is a front perspective view of the apparatus of FIG. 21 in a portable transporting position of the apparatus;

DETAILED DESCRIPTION OF THE PREFERRED EMBODIMENTS

Figure 2:
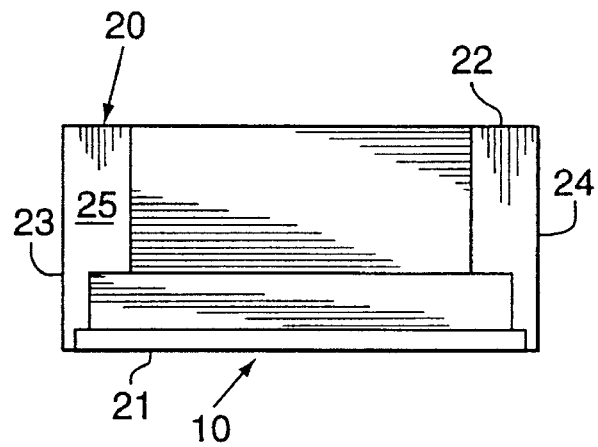
FIG. 2 is a top view of the rear screen video display system of FIG. 1.
Figure 1:
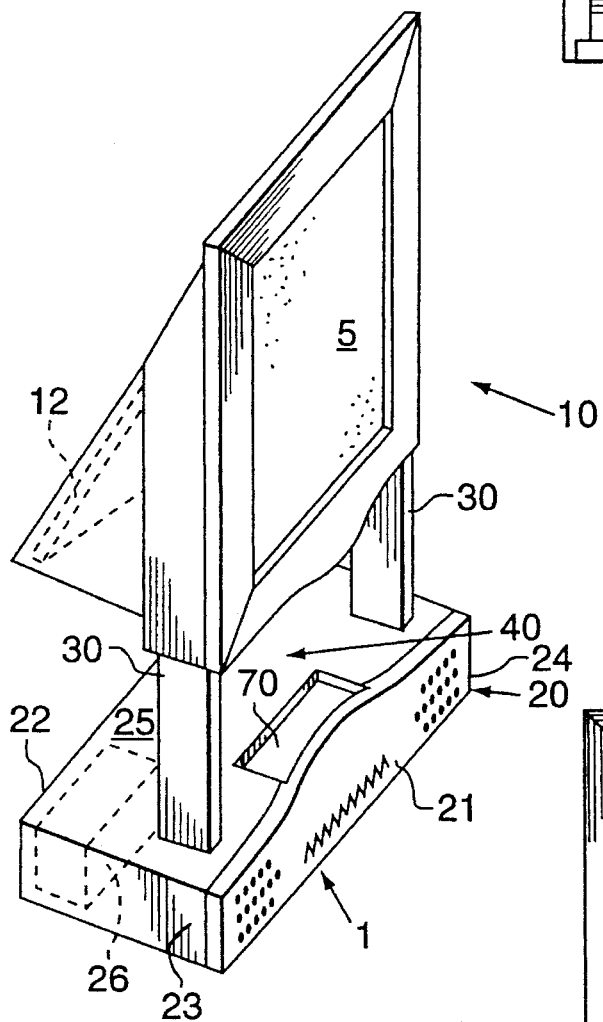
FIG. 1 is a front, perspective view of a first embodiment of a rear screen video display system according to the present invention.
Figure 3:
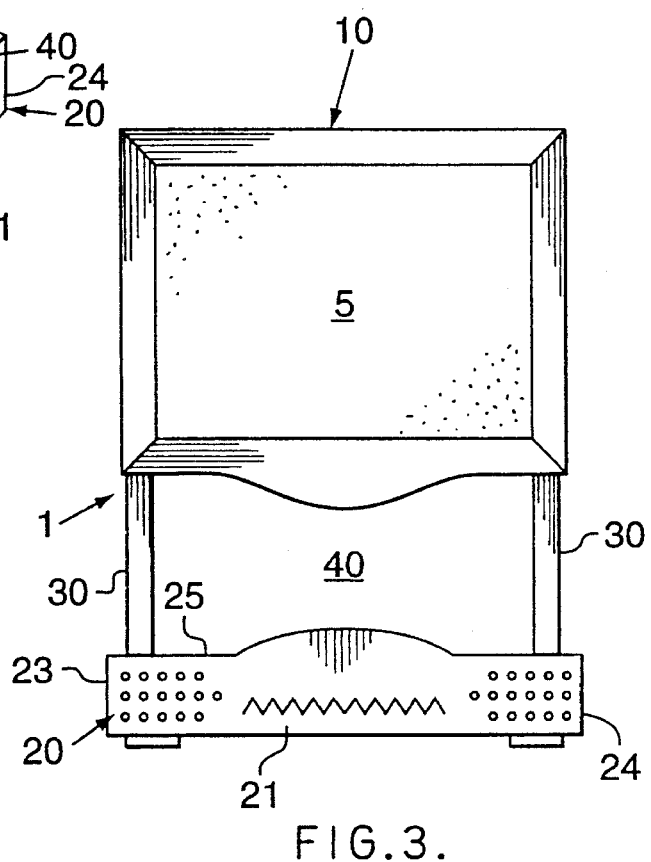
FIG. 3 is a front view of the rear screen video display system of FIG. 1.

Referring now to the drawings, wherein like numerals designate like elements throughout the various views, FIG. 1 is a front perspective view of a first embodiment of a rear-screen video display system 1 according to the present invention. The system comprises a screen unit 10, a base unit 20 and a connecting means which, in this embodiment, comprises legs 30, which rigidly maintain the base unit 20 and the screen unit 10 in a spaced relationship, whereby a "free space" 40 between the base 20 and screen unit 10 is created.

The base 20 is typically rectangular-like in shape, having front 21, rear 22, sides 23, 24 and top 25 surfaces. An LCD or other projector 26, shown in dashed lines, may be housed within the base 20. The base contains a two mirror system, although, in the preferred embodiment, only a single mirror 12 is used to receive from the projector 26 (which is shown here in a position suitable for use with a three-mirror system) an incident beam which is reflected onto screen 5. In a 3-mirror system, beam 27 (see FIG. 25) from the projector 26 is directed to a first mirror 28 which reflects the image to a second mirror 29 which further reflects and optionally magnifies the image out of opening 70 in the base unit 20, through air space 40, to a third mirror 12, shown in dash lines in FIG. 1, which is located in screen unit 10. The mirror 12 may optionally further magnify the image reflected to screen 5 for viewing.

In an alternate embodiment, the screen unit 10 may be built as a modular component, to aid in the portability of the video display system to facilitate component replacement and for packaging convenience of the overall apparatus. In such an alternate embodiment, the screen unit 10 is separable from legs 30, which may also be removable from the base unit 20.

Figure 4:
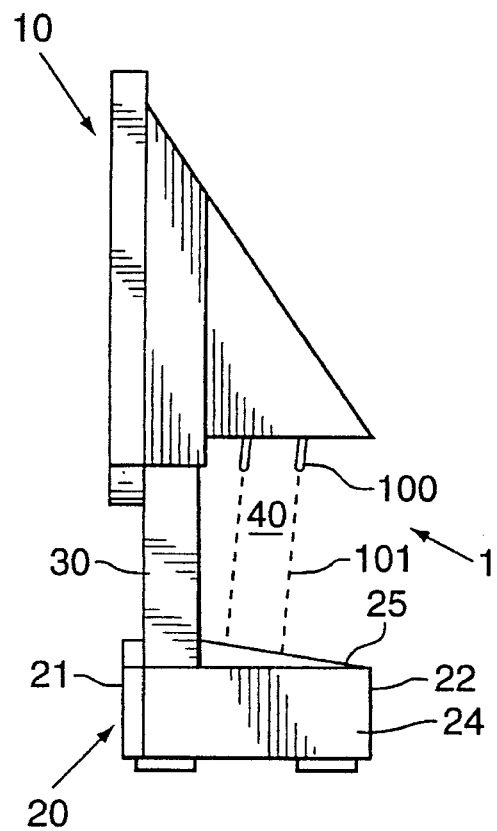
FIG. 4 is a side view of the rear screen video display system of FIG. 1.
Figure 5:
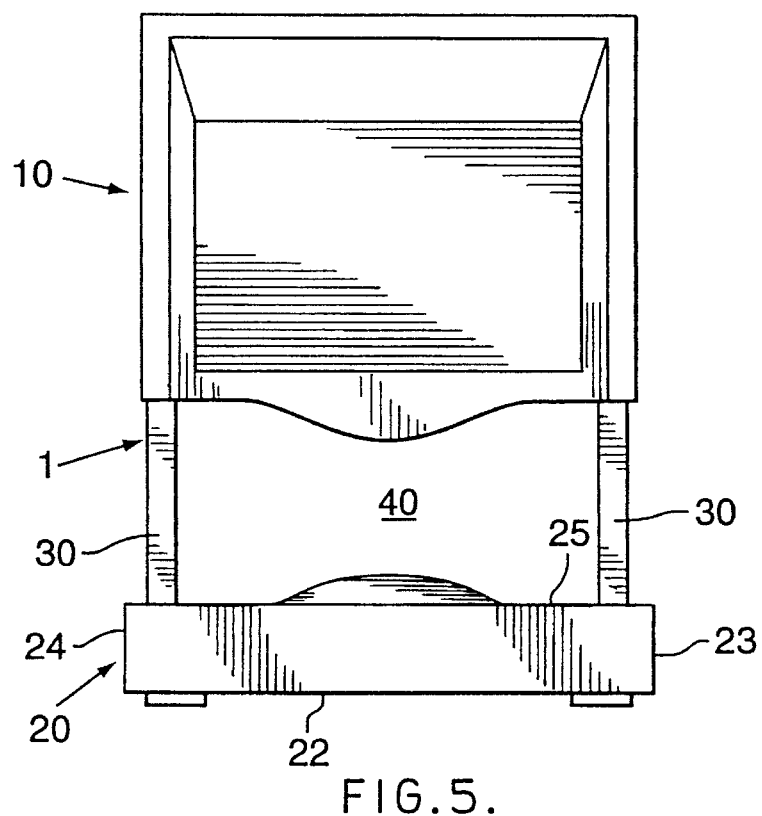
FIG. 5 is a rear view of the rear screen video display system of FIG. 1.

The screen 5 may be covered with a light control film to reduce the effects of ambient light. Alternatively, a light tunnel 100 (see FIG. 4) may be used. The light tunnel may extend the full distance between the base unit 20 and the screen unit as shown in dashed lines 101 in FIG. 4, or may simply extend a part of that distance (see 100 of FIG. 4). Alternatively, the light tunnel can, for instance, be incorporated into, for instance, the pillar 50 in the second embodiment (see FIG. 6). In such case, the position of the pillar 50 would need to be altered.

FIGS. 6–10 depict a second embodiment of a rear screen video display system according to the present invention. In this embodiment, the connecting means is a pillar 50, rather than the legs 30 shown in the first embodiment. In this embodiment, an optional location of the projector 26 is shown to be outside of the base unit and in a compartment 110 on pillar 50. The projector 26 may optionally also sit on top of the base unit 20.

Figures 6, 7, 8:
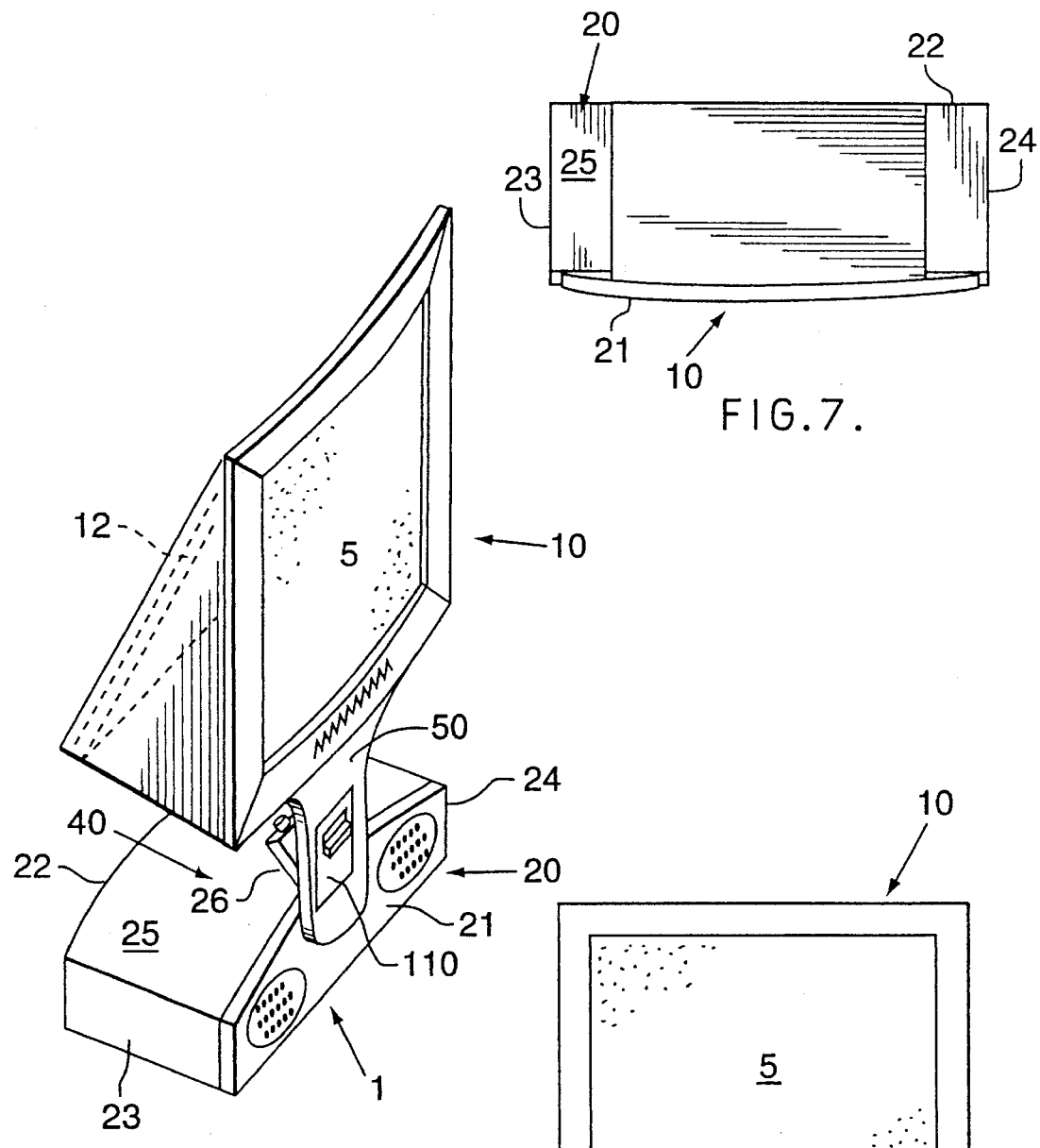
FIG. 6 is a front, perspective view of a second embodiment of a rear screen video display system according to the present invention.
FIG. 7 is a top view of the rear screen video display system of FIG. 6.
FIG. 8 is a front view of the rear screen video display system of FIG. 6.
Figure 9:
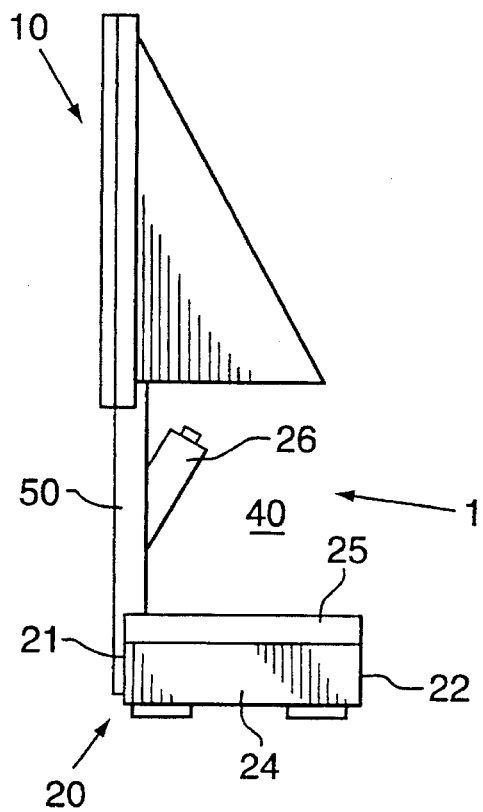
FIG. 9 is a side view of the rear screen video display system of FIG. 6.
Figure 10:
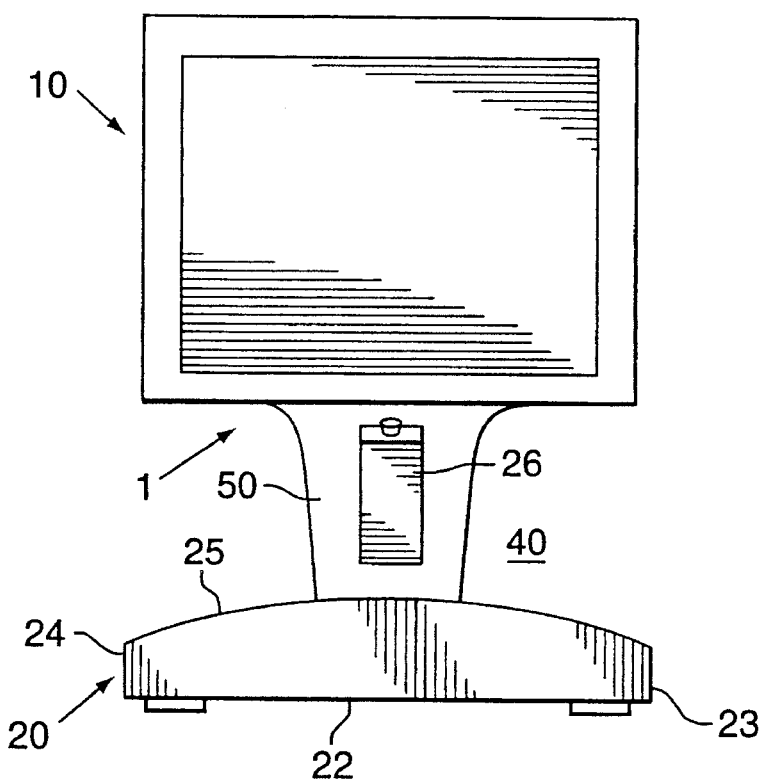
FIG. 10 is a rear view of the rear screen video display system of FIG. 6.
Figure 12:
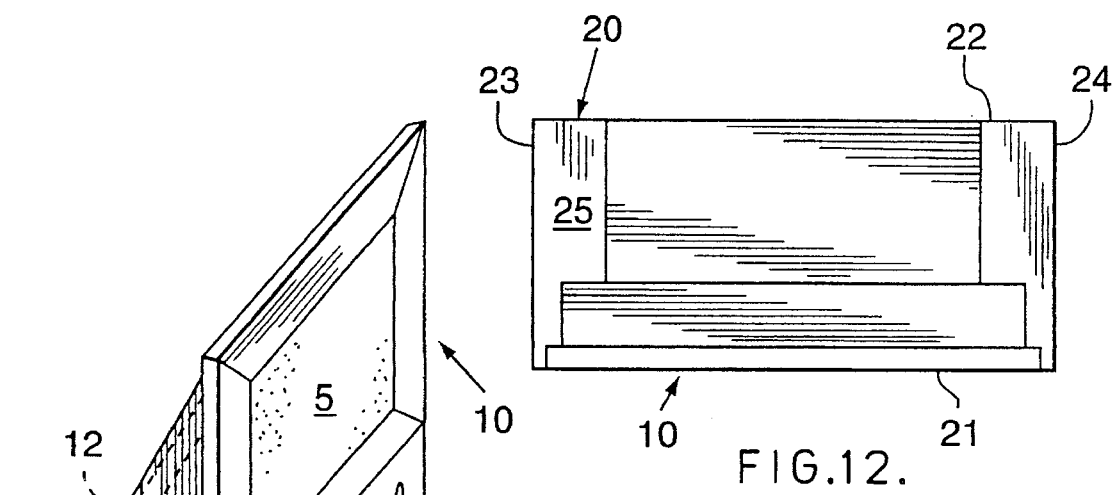
FIG. 12 is a top view of the rear screen video display system of FIG. 11.
Figure 11:
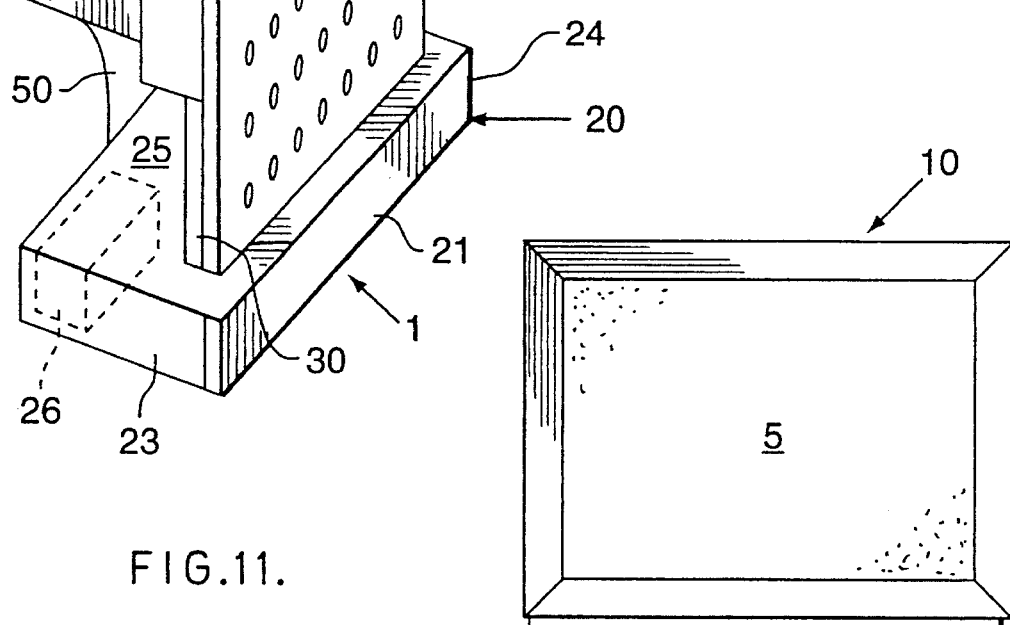
FIG. 11 is a front perspective view of a third embodiment of a rear screen video display system according to the present invention.
Figure 13:
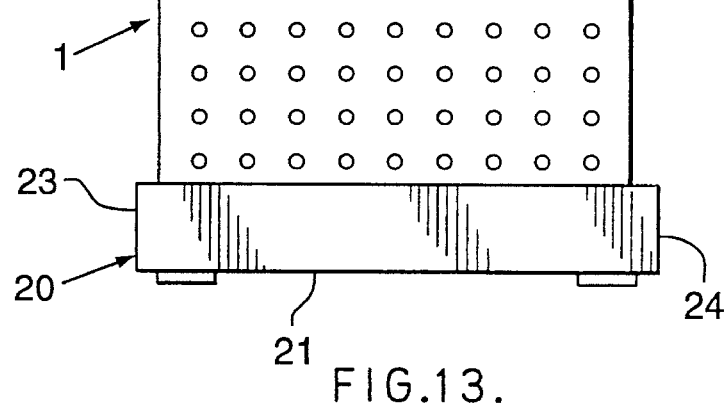
FIG. 13 is a front view of the rear screen video display system of FIG. 11.
Figure 14:
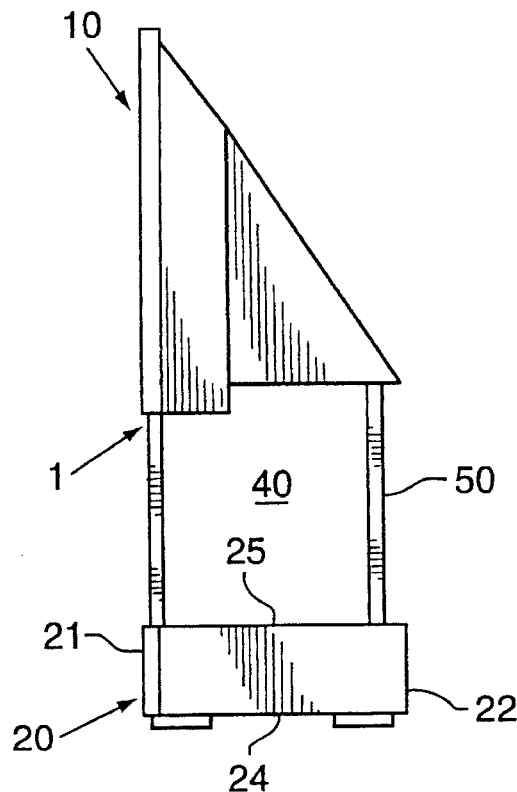
FIG. 14 is a side view of the rear screen video display system of FIG. 11.
Figure 15:
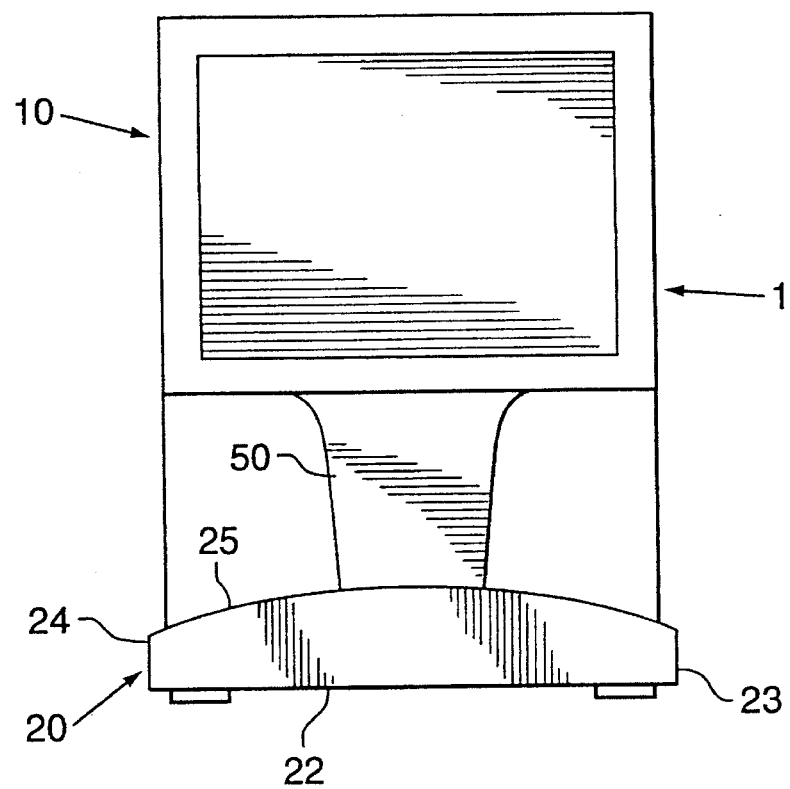
FIG. 15 is a rear view of the rear screen video display system of FIG. 11.
Figure 19:
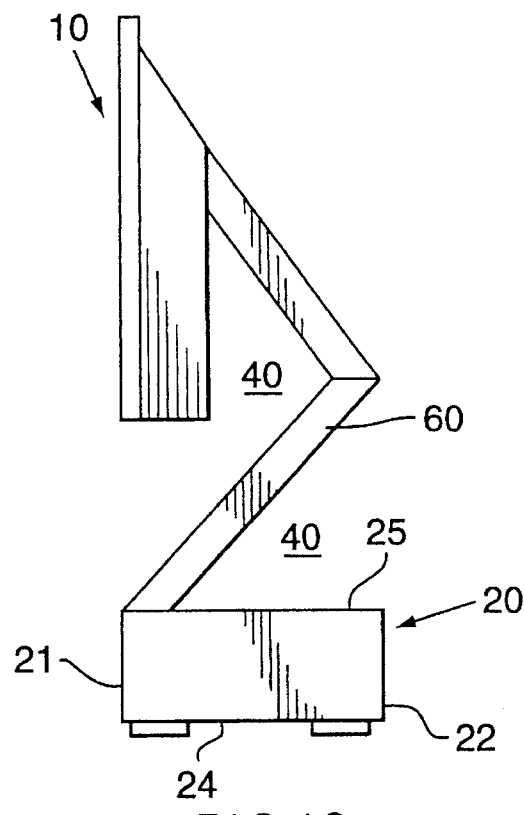
FIG. 19 is a side view of the rear screen video display system of FIG. 16.
Figure 20:
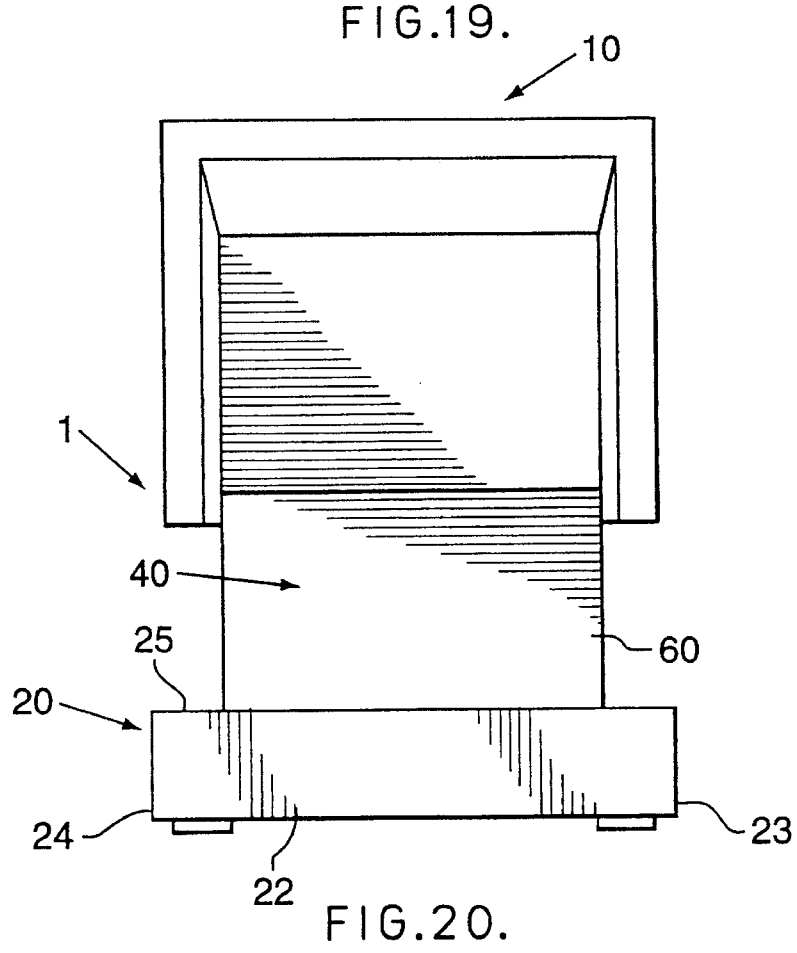
FIG. 20 is a rear view of the rear screen video display system of FIG. 16.
Figure 21:
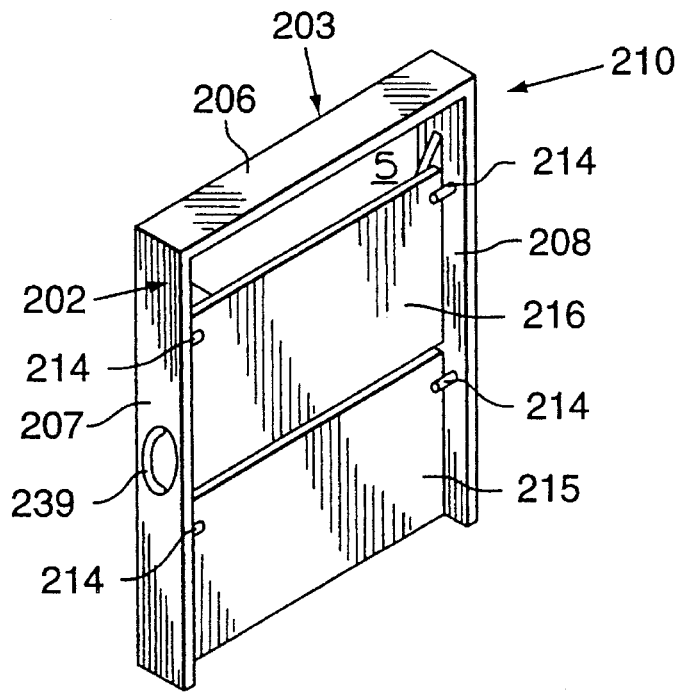
FIG. 21 is a rear perspective view of a screen unit of a fifth embodiment of the rear screen video display system according to the present invention.
Figure 22:
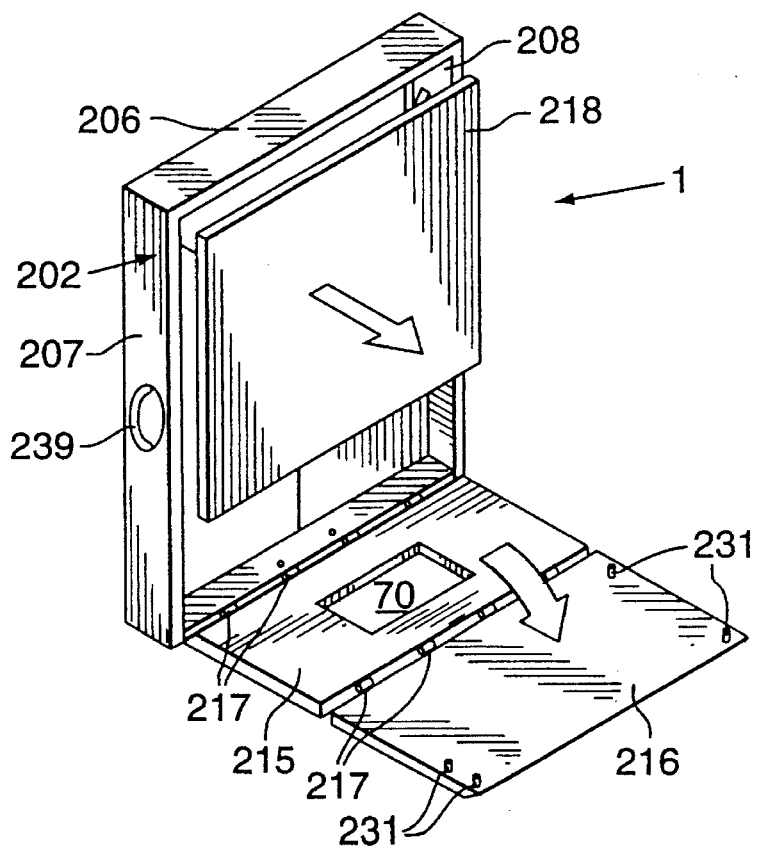
FIG. 22 is a rear perspective view of the system of FIG. 21, with the base and rear panels swung outward and down and the top panel about to be removed.

In the preferred single mirror configuration, a single mirror 12, housed in the screen unit 10 is used. In this configuration, the projector 26 would be located, for instance, in the front region of the base unit 200, as shown in FIG. 6, but at an angle. An incident beam from the projector 26 would then strike and reflect off mirror 12 in the screen unit 10 towards the screens.

FIGS. 11–15 depict a third embodiment of a rear screen video display system. In this embodiment, the front of the screen unit 10 extends downwardly to contact the base unit 20. The rear portion of the screen unit 10 is supported on a pillar. The extending front is depicted as having slots or apertures for aesthetic purposes and to reduce the weight of the overall system.

FIGS. 16–20 depict a fourth embodiment of a rear screen video display system. In this embodiment, the rigid connection means is a V-shaped support structure 60 for the screen unit 10. In this embodiment, aperture 70 in the base unit 20, permits light directly from a projector 26 or reflecting off a mirror and travelling through air space 71 to enter the screen unit 10 and reflect off mirror 12 toward the screen 5.

In a fifth embodiment of the invention, as shown in FIGS. 21–24, the screen unit 210 may be constructed in a manner somewhat similar to the portable rear screen television cabinet described in U.S. patent application Ser. No. 08/243, 885. Specifically, the screen unit 210 comprises a front rectangular structure 202, having a front panel 203, with a large rectangular screen 205. The front rectangular structure comprises a front panel 203, top plank 206 and two side planks 207, 208. The rear portion 209, as demonstrated herein, expands to accommodate a large mirror 12, which, in conjunction with mirrors 28 and 29 of the base unit and the projector 26 (see FIG. 25), brings the projected image to the rear screen 205. The base unit 20 and any pillars 50 or legs 30 may also be collapsible and portable.

Figure 23:
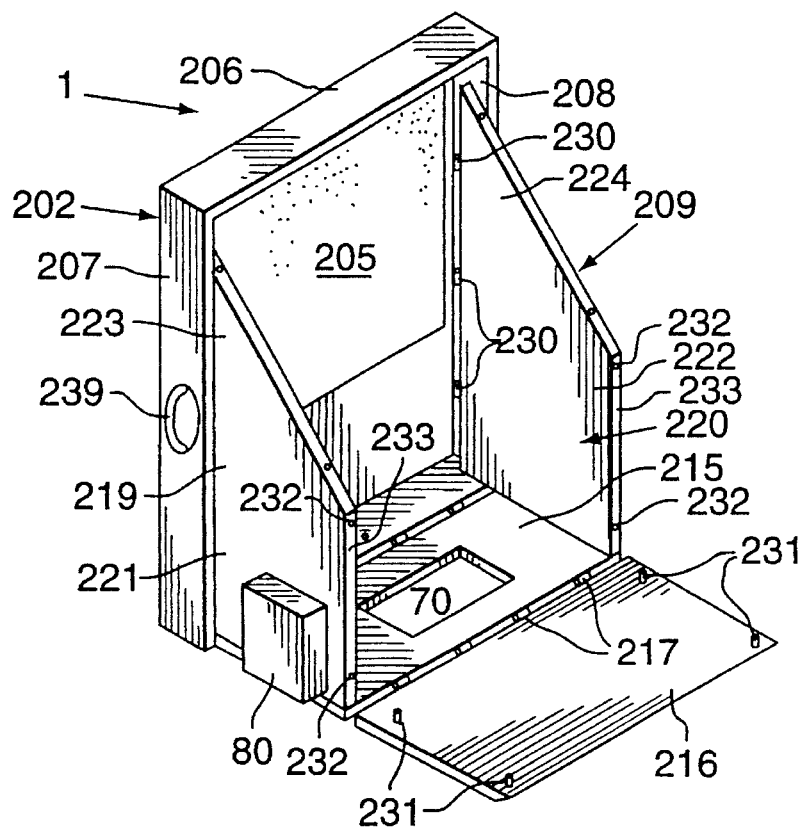
FIG. 23 is a rear perspective view of the system of FIG. 21, with the side panels swung out into operational position.
Figure 24:
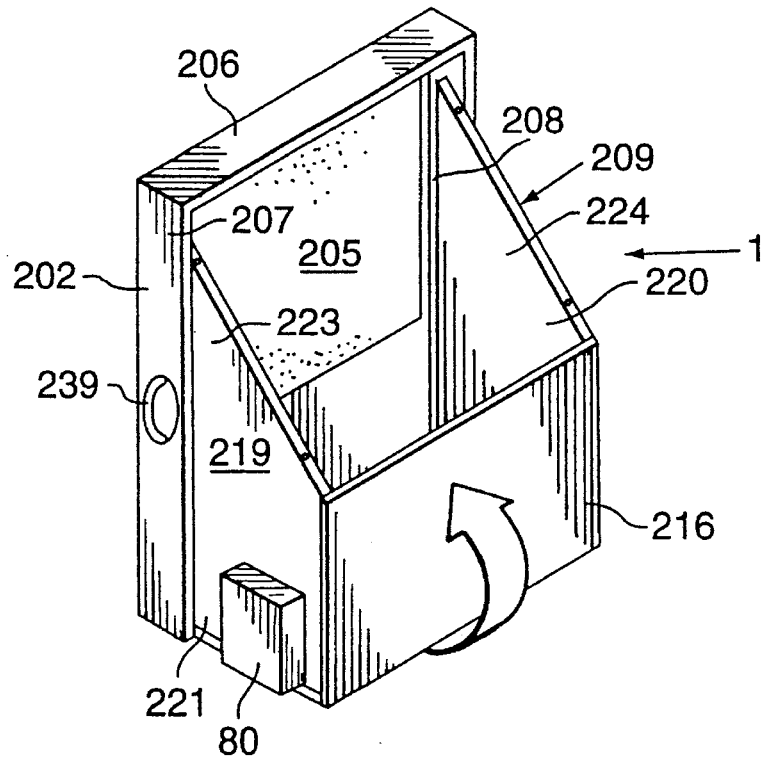
FIG. 24 is a rear perspective view of the system of FIG. 21 with the rear panel swung upward into its operational position after the side panels have been moved into its operational position.

The screen unit 210 may be set up in its operational layout in the following manner. Pins 214, which secure base panels 215, 216 are withdrawn, and the panels 215, 216 are swung outward and downward using hinges 217, as shown in FIG. 23. At this juncture, top mirror panel 218, described in more detail later, is removed. Right and left side panels 219, 220 are then swung into operational position using hinges 230. The side panels 219, 220 are formed generally each of a rectangular section 221, 222 and a triangular section 223, 224, constructed as a single piece section. The rectangular rear panel 216 is hinged to the base panel 215 via a hinging mechanism 217 (see FIG. 23). The hingeable rear panel 216 may be swung upwards so that pegs 231 in the rear panel 216 fit in corresponding holes 232 on the rear edges 233 of the side panels 219, 220. Other fastening systems may, of course, be used properly to secure the panels. An aperture 70 is cut out of bottom panel 215, permitting a light beam from a projector 26 or mirror to enter screen unit 10.

Leg housing 80 (see FIGS. 23–24), or other securing means may be adapted to side panels 219, 220 to accommodate the legs 30 of the device so that the screen unit 210 is properly positioned above the base unit 20. In the modular alternate embodiments and in this fifth embodiment, the screen unit 210 may actually be removed from the legs 30 or the pillar 50. The legs 30 or the pillar 50 are also removable from the base unit 10. In this embodiment, the screen unit 10, folds into a small profile. The base unit 20, as explained, may also be foldable, collapsible and portable.

In one embodiment of the invention, the legs 30, are removed from the base unit 20 and are stored within the screen unit 10 in order more easily to transport the unit 1. (See FIG. 27).

A mirror system 12, 28 and 29, may comprise three front surface mirrors (see FIG. 25). Mirror 12 is in the screen unit and mirrors 28, 29 are in the base unit. This mirror system facilitates projection from the projector onto the rear screen 5. The mirrors 28 and 29 may be placed in the base unit 20, as shown. In the preferred embodiment, an odd numbered set of mirrors (and preferably one) is used to reverse the orientation of the projected image to facilitate correct viewing on the rear screen 5. One or more mirrors may be curved to enlarge the reflected image thereby to decrease the distance between mirrors which permits use of a smaller cabinet.

Preferably, in a three-mirror system, the three mirrors 12, 28, and 29 (see FIG. 25) are oriented as follows: a first mirror 28 is positioned to reflect the incident image 90° from the initial orientation. Thus, the mirror 28 is angled 45° with respect to the angle of the initial projection beam 27. The reflected beam 36 passes to a second mirror 29 which is angled preferably 40° with respect to the vertical and is tilted upwards. Angles smaller than 40° are possible: Any distortion could be corrected by building optical correction into the curvature of the mirrors. The beam 36 from the first mirror 28 is reflected (beam 37) off the second mirror 29, through free space 40 to a third mirror 12 in the screen unit 10. The third mirror 12 is diagonally oriented with respect to both the base unit 20 of the device 1, as well as the front panel face of the device 1. The third mirror 12 is also angled 40° with respect to the vertical, although other angles are possible. The beam 38, is reflected off this third mirror 12 and proceeds to the rear screen 5 for viewing.

Although the sizes of the mirrors 12, 28 and 29 may vary depending on, for example, the size of the screen, the size of the overall assembly, the distance between the mirrors and the screen and beam divergence (due to the nature of the projection lens of the projector 26), subsequent mirrors are always larger than the previous ones. The mirrors may be secured to any planar structures, using standard means and those structures can, in turn, be secured to the overall device by any standard means.

The overall assembly may be easily folded and disassembled in order to fit into a compact unit. To achieve this, the following steps may be taken: the top panel mirror 218 having the largest mirror 12, is removed or swung away on hinges. The rear panel 216 should be detached from the rear edges 233 of the side panels 219, 220 and the side panels 219, 220 should be swung inward into the front 202 of the device 1. The top mirror panel 218 may now be secured. The base panel 215, as well as the rear panel 216 are then folded in and secured by pins 214. A recessed handle 239 or any other means may be adapted to the cabinet to facilitate transportation.

According to another aspect of the invention, the external appearance of the rear screen video display cabinet can be changed by removing panel surfaces on the visible planar surfaces of the cabinet in case such surfaces become damaged, worn or if the owner simply desires a different aesthetic appearance for the system. For instance, FIG. 26 shows cover strips 206A, and 207A which are adhered to top plank 206 and side plank 207 by known means and which may be removed from the top plank 206 and side plank 207. This feature can be implemented on each of the embodiments disclosed herein for all exposed planar surfaces of the cabinets as well as the following sixth embodiment.

Figure 28:
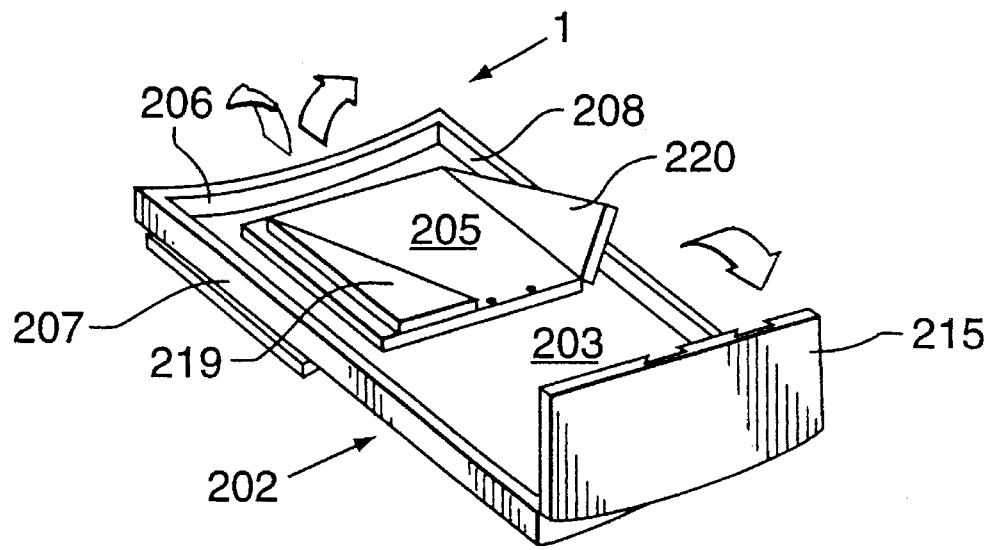
FIG. 28 is a rear perspective view of a sixth embodiment on the rear screen video display system according tot he present invention in a prone position.
Figure 29:
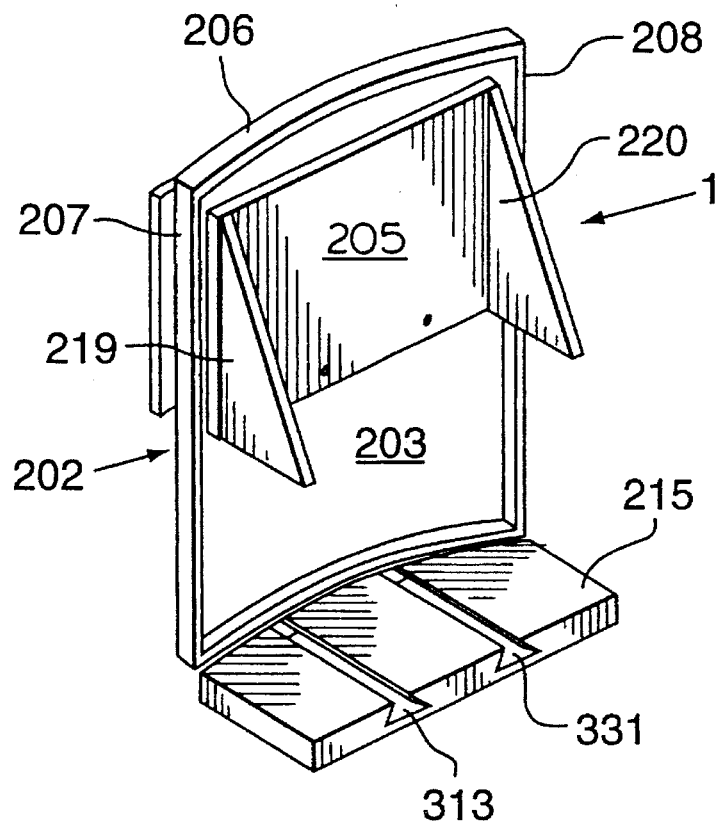
FIG. 29 is a rear perspective view of the system of FIG. 28, in an upright position, with side and base panels locked into position.
Figure 35:
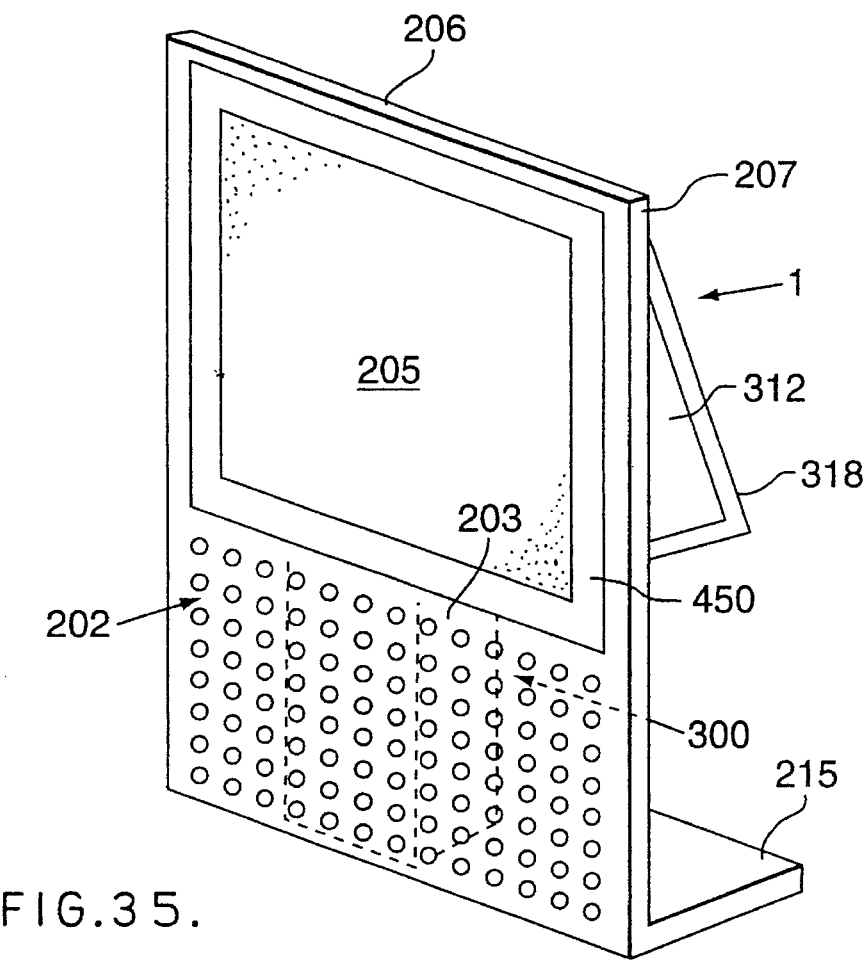
FIG. 35 is a front perspective view of the rear screen video display system according to the invention.
Figure 36:
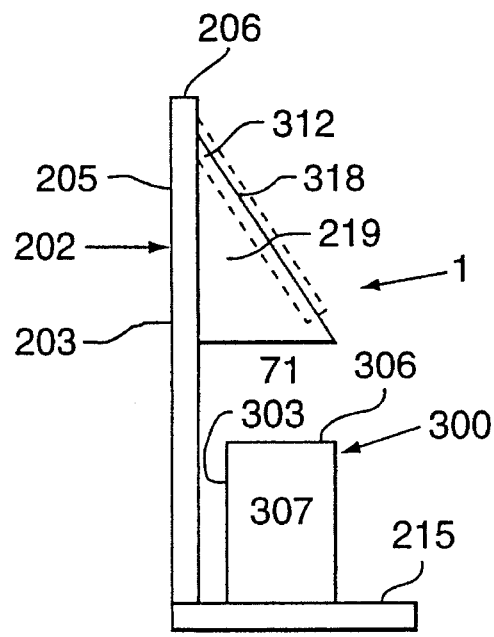
FIG. 36 is a side view of the system shown in FIG. 35.

FIGS. 28–36 depict the assembly of a sixth embodiment of a rear screen video display system according to the invention. FIG. 28 shows the system 1, in a prone perspective position ready to be assembled. In the pre-assembled condition, the system may be readily shippable via mail, U.P.S., or other carrier. The system comprises a front rectangular structure 202 comprising a front panel 203 (see FIG. 35) having a screen 205 and left, right and base panels 219, 220 and 215. The front structures 202 may be made from various types of material, including sheet metal, wood, plastic, etc., and has, for instance, a large number of apertures, as shown in FIG. 35. The structure 202 further comprises top plank 206 and two side planks 207 and 208.

To prepare the system for operations, the left and right and base panels 219, 220, 215 are "unfolded" or swing open, and fastened into position and placed upright, as shown in FIG.

29. The pivoting and locking mechanisms for the panels 219, 220, 215 are well-known conventional mechanisms. While preferably, the base, right and left panels are pivotally attached to the front panel, they may be attached to the front panel by other appropriate means—e.g., pins receivable in respective holes in the back surface of the front panel.

Figure 30:
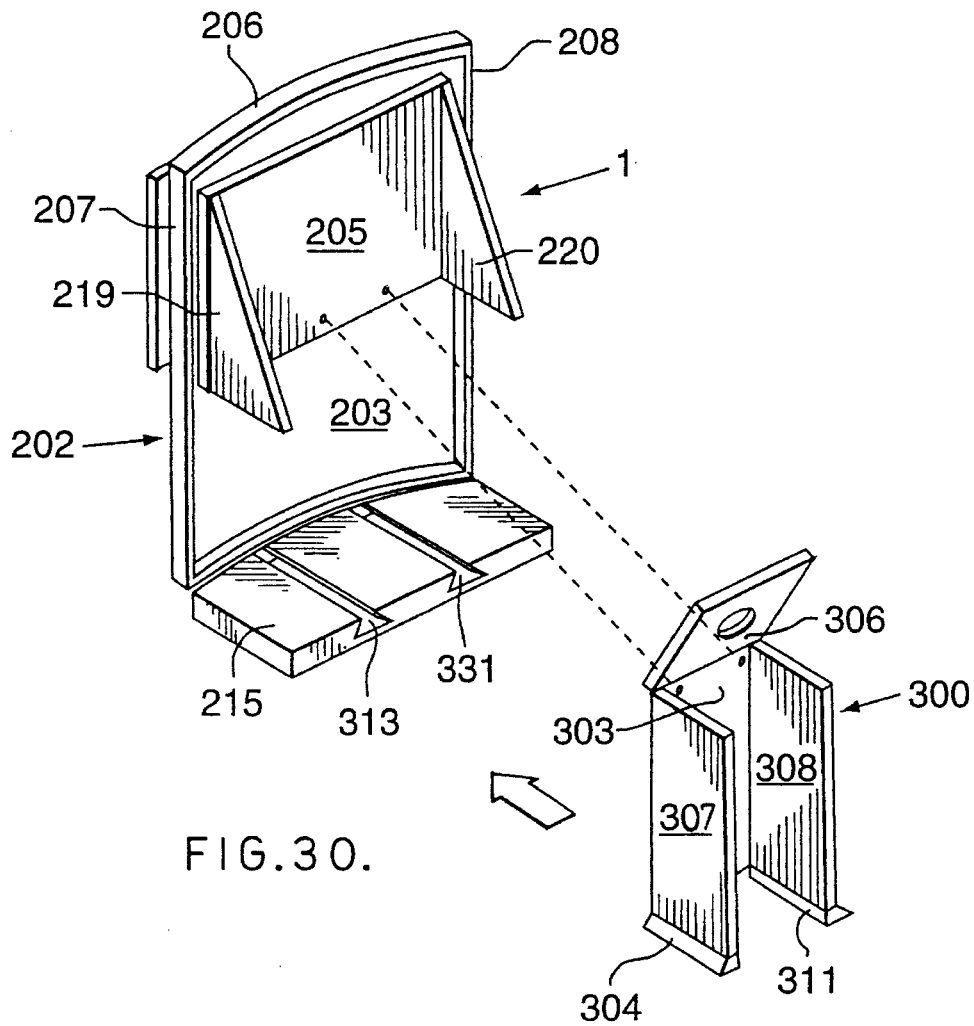
FIG. 30 is a rear perspective view of the system of FIG. 29, including a projection box assembly component of the invention.
Figure 33:
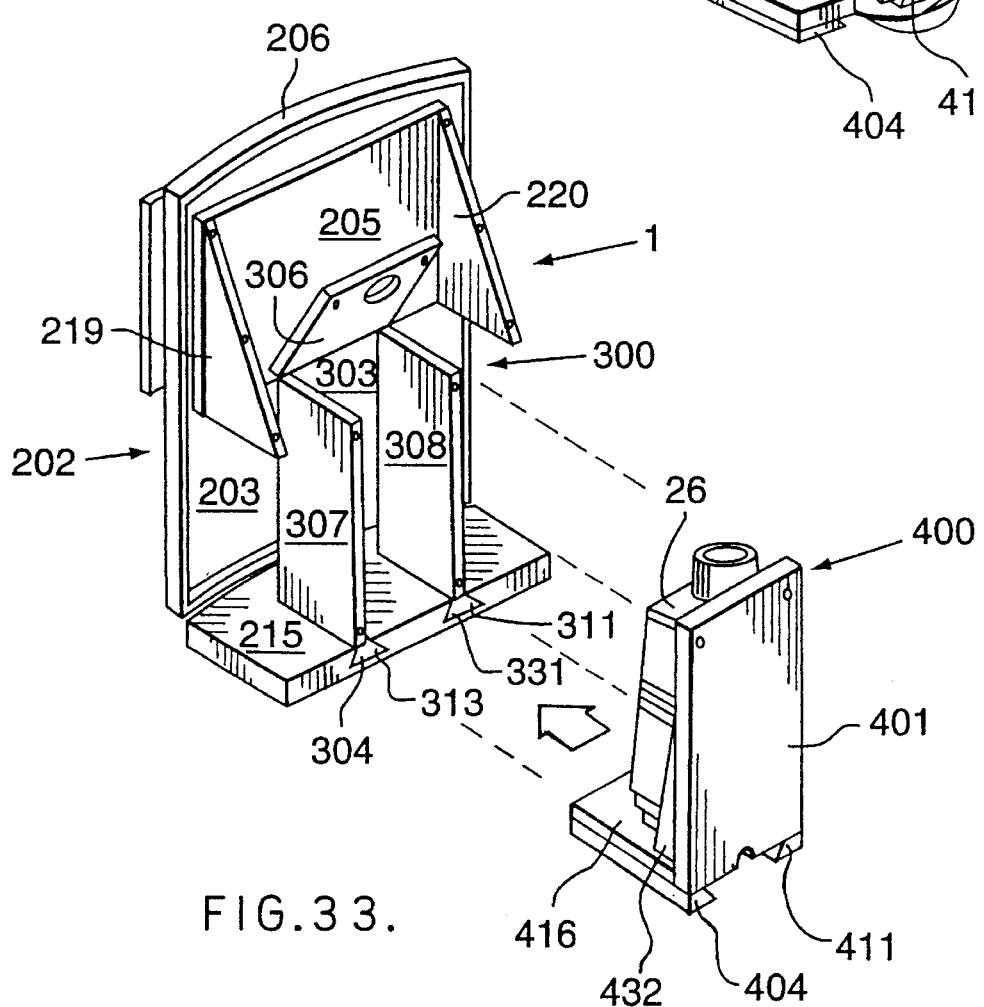
FIG. 33 is a rear perspective view of the system, including both the projector box and stand assembly components.
Figure 34:
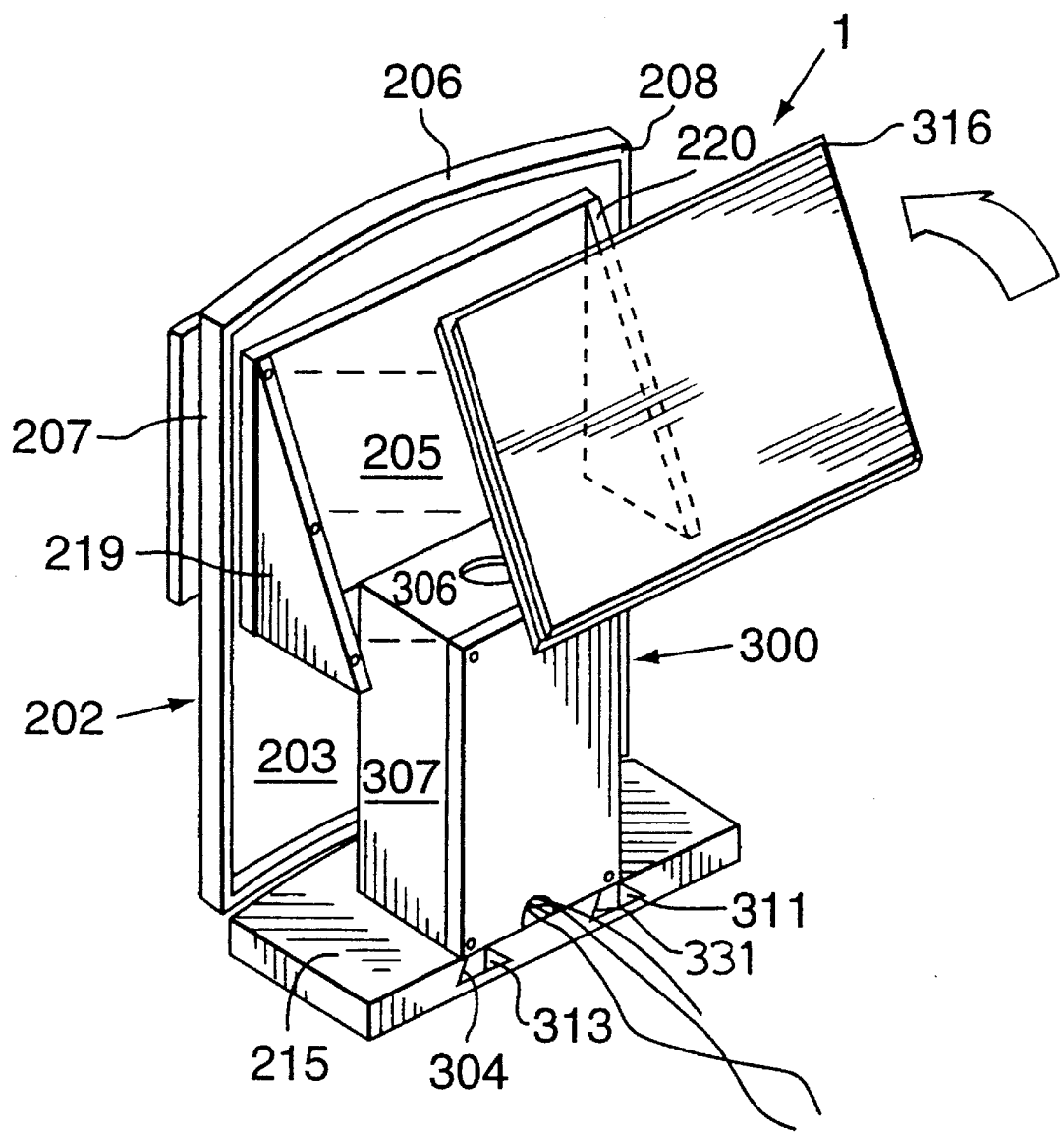
FIG. 34 is a rear perspective view of the system, including the main components.

The next step in assembling the system is to prepare for the insertion of the projector box assembly 300 (see FIG. 30) into the system. The projector box assembly 300 comprises front plank 303, pivotable left, right and top planks 307, 308, 306 and half-wedges 304, 311 attached to the bottom of the left and right planks 307, 308. The left and right planks 307, 308 should be folded or swung into position so that they are perpendicular to the front plank 303, as shown in FIG. 30. The assembly 300 should then be secured into position into the system by aligning the half-wedges 304, 311 on the base panel 215 with complementary conforming slots 313 and 331 and pushing the assembly 300 in, thereby permitting the half-wedges 304, 311 to be slid into slots 313, 331, as shown in FIG. 33.

Figure 31:
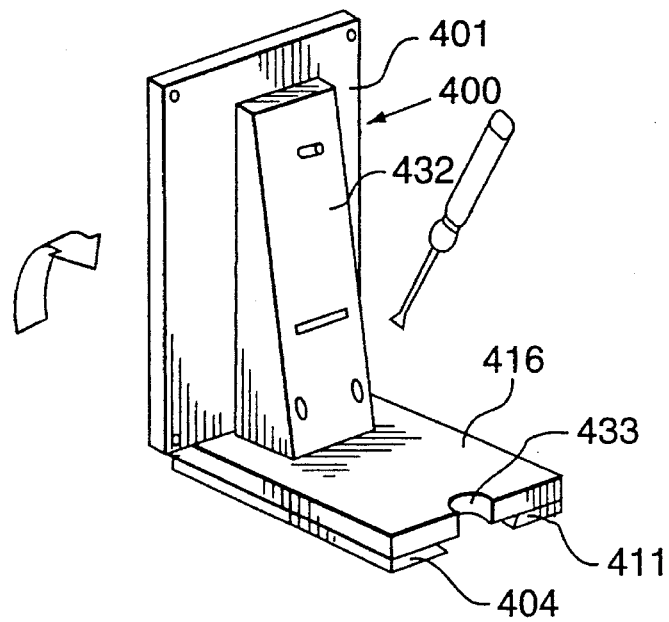
FIG. 31 is a rear perspective view of the projection stand assembly component of the invention.
Figure 32:
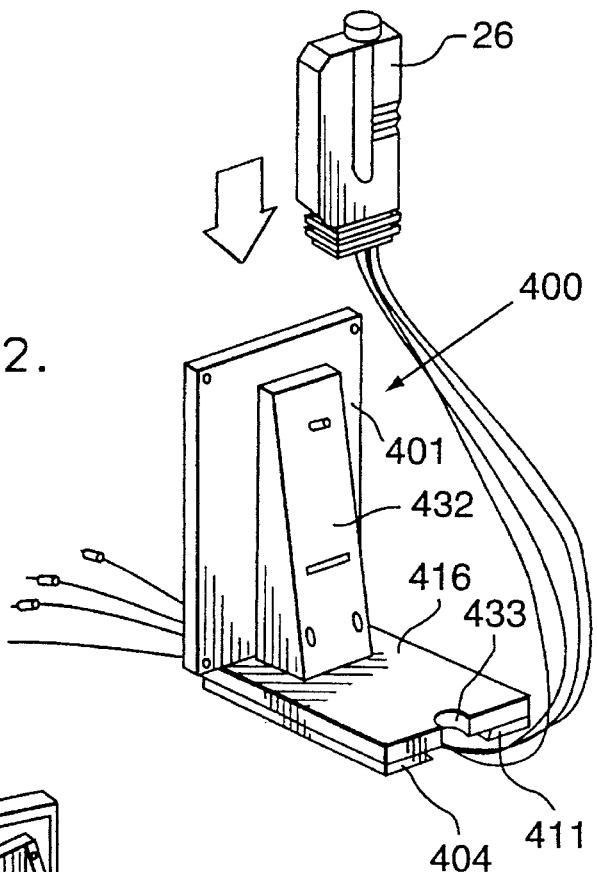
FIG. 32 is a rear perspective view of the projector stand assembly of FIG. 31, including a projector.

The next step involves preparation of the projector stand assembly 400 (see FIG. 31), which comprises a rear plank 401, base plank 416 having wedges 404, 411, projector mounting plate 432 and a cord slot 433. Rear plank 401 should be "folded" or pivoted upward to be perpendicular to the base plank 416 as seen in FIG. 31 and fastened by well-known conventional mechanisms. A projector 26 is now ready to be mounted into position onto the mounting plate 432 after cords of the projector are placed into the slot 433 and pulled under the base plank 416 (between half-wedges 404, 411) towards the front of the system as shown in FIG. 32. The projector stand assembly 400 of the system is now ready to be positioned into the system 1 with rear plank 401 facing the back of the system 1, by sliding the half-wedges 404 and 411, which are complementary to the half-wedges 304, 311 of the box assembly 300, into slots 304, 311 (see FIG. 6). Top plank 306 is then lowered to close the projector box assembly 300. The projector box assembly 300 and stand assembly 400 provide for easy and rapid removal of projector 26. Thereby, if desired, projector 26 can be used for front projection.

The next step is to connect mirror panel 318, containing mirror 312 to the rear edge of left and right panels by mirror brackets (not shown). The power cord and audio/video cables are now ready for connections and the system is operational. When this embodiment of the invention is operational, a beam emanating from the projector 26, travels through air space 71 (see FIG. 36), reflects off mirror 312 and strikes screen 205, creating an image thereon. As therefore seen in FIG. 36, this embodiment therefore also has an "exposed beam path," similar to the first-fifth embodiments. The beam path may not be readily visible to viewers in front of the system but may be visible from the side. However, a "glow" from the "exposed" nature of the beam may be visible to viewers in front of the system. Also similar to the first-fifth embodiments, various external planar surfaces of the system may be removed and replaced for repair, or simply to provide a different aesthetic appearance. For instance, frame 450 (see FIG. 35) is easily replaceable.

While the preferred embodiments of the invention have been depicted in detail, various modifications and adaptations may be made thereto, without departing from the spirit and scope of the invention, as delineated in the appended claims.

What is claimed is:

1. A rear screen video display system, comprising:
    a panel means including a front panel for supporting a screen and a base panel attachable to the front panel;
    a housing structure for housing a projector, the base panel having means cooperating with respective means of the housing structure for releasably retaining the housing structure, the housing structure including means for supporting the projector in said housing structure; and
    mirror means located in a spaced relationship to the housing structure form reflecting the image emanating from the projector to the screen supported on the front panel;
    wherein said panel means is a rectangular, foldable structure, and wherein the base panel is pivotally attached to the front panel, said panel means further including right and left panels pivotally attached to the front panel.

2. The rear screen video display system of claim 1, wherein said housing structure is formed as a box-like structure.

3. The rear screen video display system of claim 2, wherein the box-like structure is foldable and is formed of three panels pivotally attachable to each other, two side panels and a bridge panel connecting the two side panels.

4. The rear screen video display system of claim 3, wherein the housing structure retaining means provided on the base panel comprises two spaced wedge-like slots, and the respective means of the housing structure comprises wedge means attached to bottom surfaces of the side panels of the housing structure and slidable into the two wedge-like slots of the base panel.

5. The rear screen video display system of claim 4, wherein the projector supporting means comprises a projector supporting stand releasably received in the housing structure.

6. The rear screen video display system of claim 5, wherein the wedge means comprises two half-wedge shoes attached to the bottom surfaces of the side panels of the housing structure, and the projector supporting stand has two further half-wedge shoes complimentary to the two half-wedge shoes of the housing structure and attached to a bottom of the stand for releasably retaining the stand in the housing structure.

7. The rear screen video display system of claim 1, wherein said mirror means is supported on said side panels.

8. A rear screen electronic video display system for displaying electronic video images, said system comprising:
    a base;
    a panel means for supporting a screen;
    a projector for projecting images onto the screen;
    a housing structure circumscribing at least a portion of said projector and including means for fixedly supporting the projector in a predetermined position relative to the screen in an operational condition of the system, said supporting means having means for releasably retaining the projector on or above said base;
    mirror means, located in a predetermined spatial relationship relative to the projector and to the screen, wherein said mirror means reflects images emanating from said projector onto a rear surface of the screen, whereby the video display system operates as a rear screen video display system and said projector, when removed from said releasably retaining means, being adapted to be used for "front" projection of images; and
    means for substantially decreasing ambient light from entering said system.

9. The rear screen video display system of claim 8, wherein said housing structure is a docking station for enabling insertion and removal of said projector.

* * * * *